United States Patent [19]
Dennis

[11] 3,733,504
[45] May 15, 1973

[54] SELF SUPPORTING ROTARY ELECTRICAL DEVICE

[75] Inventor: Jack R. Dennis, West Chester, Pa.

[73] Assignee: Harowe Servo Controls, Inc., West Chester, Pa.

[22] Filed: July 27, 1971

[21] Appl. No.: 166,513

[52] U.S. Cl. ..................310/86, 310/90, 310/105
[51] Int. Cl. .............................................H02k 5/10
[58] Field of Search..................310/90, 91, 85–89, 310/103, 106, 105, 162; 318/166

[56] References Cited

UNITED STATES PATENTS

| | | | |
|---|---|---|---|
| 2,547,599 | 4/1951 | Roters | 318/166 |
| 3,195,466 | 7/1965 | Young | 310/90 |
| 2,911,549 | 11/1959 | Culk | 310/90 |
| 2,328,743 | 9/1943 | Roters | 318/166 |
| 2,741,990 | 4/1956 | White | 310/89 UX |
| 2,994,795 | 8/1961 | Cattabiani | 310/85 |
| 3,229,130 | 1/1966 | Drouard | 310/86 |
| 3,228,341 | 1/1966 | Hungerford | 310/90 |
| 3,231,768 | 1/1966 | Dannemann | 310/86 |

Primary Examiner—R. Skudy
Attorney—Woodcock, Washburn, Kurtz & Mackiewiez

[57] ABSTRACT

A magnetic sleeve is disposed in the space between the stator and the rotor of a hysteresis synchronous motor. The sleeve supports the stator and closes internal slots in the stator core. The sleeve also carries bearings for mounting the rotor for relative movement with respect to the stator.

8 Claims, 3 Drawing Figures

PATENTED MAY 15 1973 3,733,504

3,733,504

SELF SUPPORTING ROTARY ELECTRICAL DEVICE

BACKGROUND OF THE INVENTION

This invention relates to rotary electrical devices, and more particularly, to rotary electrical devices having a rotor and a stator.

In general, rotary electrical devices including such devices as motors and synchros support the rotor and the stator on the housing of the device. In devices of this kind, the housing may itself become a rather expensive component of the device since the housing must be machined to assure the appropriate spacing of the stator and the rotor.

In this connection, reference is made to U.S. Pat. No. 2,328,743 — Roters which illustrates and describes a hysteresis synchronous motor wherein a housing shell engages and supports the stator core lamination while also supporting the rotor in suitable bearings. As clearly set forth in the patent, the air gap between the rotor and the stator core is extremely critical in a hysteresis synchronous motor and this gap which is in part determined by a sleeve within the stator core is critically dependent upon the maintenance of the appropriate rotor-stator relationship as provided by the housing shell.

In U.S. Pat. No. 2,547,599 — Roters, the necessity for supporting the stator and the rotor on the housing of a hysteresis synchronous motor has been eliminated. This has been accomplished by the use of a sleeve which is attached to the ends of the lamination stator assembly. The sleeve also supports the rotor through bearings located at each end thereof. Although this sleeve does in effect provide a self-supporting electrical rotary device, the stator is supported by the end laminations alone and there is no support of the stator by the sleeve between the end laminations. It will also be noted that the sleeve does not extend into nor does it close the stator slots in the rotor tunnel. The parasitic hysteresis losses are minimized by lamination design which provides externally rather than internally opening slots.

SUMMARY OF THE INVENTION

In accordance with one aspect of the invention, a self-supporting electrical rotary device is provided including a supporting sleeve extending through a rotor tunnel in a stator core for engaging and supporting the stator core along its entire length. The rotor of the device is also supported by the sleeve on suitable bearings. The sleeve comprises a magnetic or nonmagnetic material depending upon the size of the air gap required and the type of device. Each of the sleeve members includes a first section of lesser thickness extending into the rotor tunnel so as to control the air gap and support the stator and a second section of greater thickness extending away from the rotor tunnel for support of the rotor and rotor bearings. Since the stator may comprise a pair of sleeve members formed from laminations which are punched to size and the sleeve itself may be prefinished to size, the stator and the rotor may be supported by means other than a costly machined housing.

In accordance with another aspect of the invention, the sleeve may be utilized in a hysteresis synchronous motor to close internal slots in the stator core. The sleeve thus provides the dual function of reducing parasitic hysteresis losses as well as supporting the stator and rotor.

DETAILED DESCRIPTION OF THE PREFERRED EMBODIMENT

Figure 1:
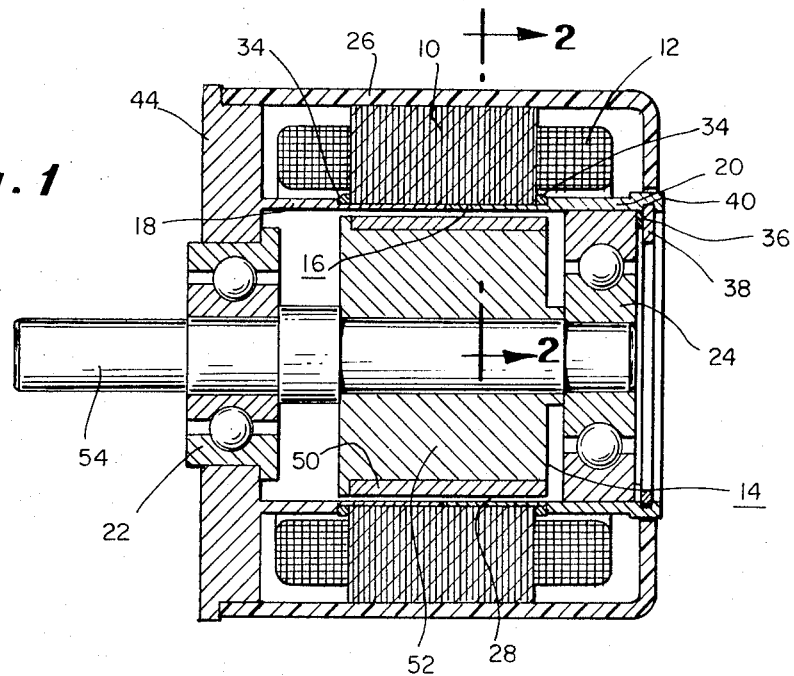
FIG. 1 is an axial sectional view of a hysteresis synchronous motor embodying the invention.

As shown in the drawings, a hysteresis synchronous motor comprises a stator core 10, a stator winding 12, and a rotor 14. The stator core 10 which comprises a plurality of stator laminations is supported by a stator sleeve 16 comprising a first or front sleeve member 18 and a second or rear sleeve member 20. In addition, the sleeve 16 also supports the rotor 14 by a pair of bearing means including a front ball bearing assembly 22 and a rear ball bearing assembly 24. Thus, in accordance with one important aspect of the invention, the sleeve 16 serves to support the motor assembly thus eliminating the need for an expensive machined housing to provide that support. A protective cover 26 extending from the front sleeve member 18 to the rear sleeve member 20 is provided to protect the windings. There is no support provided by the cover 26.

In accordance with another aspect of the invention, sleeve members 18 and 20 engage and support the stator 10 along the entire axial length of the stator rotor tunnel 28. In other words, each lamination of the stator core 10 is engaged by and supported by either the front sleeve member 18 or the rear sleeve member 20. The assembly is held together by a suitable epoxy cement.

Figure 2:
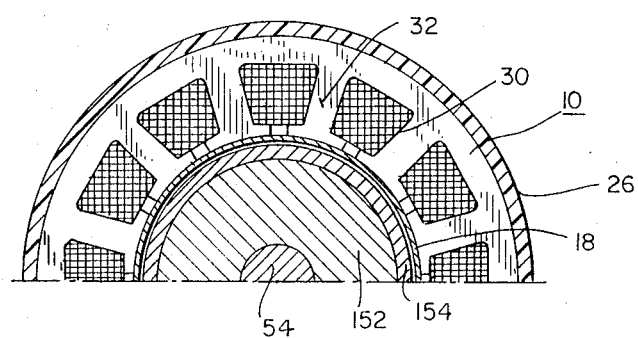
FIG. 2 is a sectional view of the motor in FIG. 1 taken along line 2—2.

As may be best understood by reference to FIG. 2, the stator sleeve members 18 and 20 which comprise a magnetic material such as stainless steel type 416 actually close the internal slots 30 between a plurality of radially extending, angularly spaced teeth 32 of the core 10. Thus, the teeth 32 of each lamination, which together form an interrupted substantially cylindrical surface at the stator tunnel 28, individually engage and are supported by the pair of sleeves 18 and 20.

It may be seen that the sleeve members 18 and 20 have lesser thicknesses in the area of engagement with the stator core 10. The purpose of this reduced thickness is to furnish magnetic material of the proper thickness to bridge the stator slots of a hysteresis synchronous motor. Non-magnetic washers 34 at opposite ends of the core 10 are used to position the stator core.

The rear of the sleeve member 20 is somewhat thicker where the ball bearing assembly 24 is carried ahead of a spring 36 and a retaining ring 38 is held within an annular groove 40. The face 44 of the front sleeve member 18 extends radially outwardly to a maximum outside diameter even greater than the stator 10. This portion of the sleeve 16 in combination with the protective cover 26 serves to enclose the device. The face 44 in combination with the bearing assembly 22 act as a pilot diameter and mounting surface for the motor.

As mentioned previously, the stator which is formed from a stack of laminations which may comprise a magnetic material such as nickel iron or silicon steel is wound with a polyphase winding so as to develop a rotating field upon excitation of the stator winding 12 by means of leads (not shown) extending through the protective cover 26. It will of course be understood that the stator core 10 may be provided with an appropriate number of slots and the stator winding 12 may be provided with an appropriate number of windings and phases in accordance with principles well understood in the hysteresis synchronous motor art.

In this connection, it will also be understood that the rotor 14 comprises, at least in part, a magnetic material also having a high hysteretic constant. In the particular synchronous motor illustrated in the drawings, a rotor shell 50 comprises a magnetic material having a high hysteretic constant carried by a hub 52 mounted on a rotor shaft 54. It will of course be understood that the different rotor structures having different numbers of poles may be provided again in accordance with principles well understood in the art.

Figure 3:
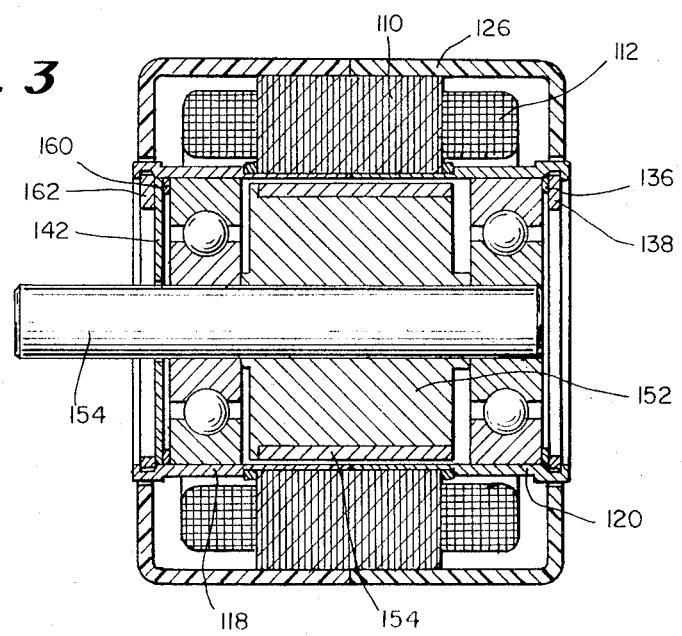
FIG. 3 is an axial sectional view of another embodiment of the invention.

FIG. 3 shows another hysteresis synchronous motor embodying the invention where the front sleeve member 118 and the rear sleeve member 120 are identical. With this arrangement, the cover 126 comprises two identical halves. The bearing assemblies 122 and 124 are also identical with a dust cover 142 being located in front of the assembly 122 between a spring 160 and a retaining ring 162. Elements similar to those described with reference to FIG. 1 carry similar reference characters with a preceding digit "1."

In the hysteresis synchronous motors described in the foregoing, the sleeve member 18 and 20 as well as 118 and 120 have comprised a magnetic material. However, the sleeve in other types of motors and in other rotary electrical devices such as synchros need not comprise such a material. In fact, the sleeve may comprise a non-magnetic material. In the case of nonmagnetic material, the sleeve itself would form part of the air gap. In any event, the sleeve precisely defines the air gap. When the sleeve comprises a nonmagnetic material, the air gap is determined by the thickness of the sleeve in combination with the air gap between the sleeve and the rotor since the stator core engages the sleeve along the entire axial length of the stator core. When the sleeve comprises a magnetic material, the air gap is limited entirely to the space between the sleeve and the rotor since again the core engages the sleeve along the entire axial length thereof.

Throughout the specification, the sleeve has been referred to as engaging the stator. This use of the word engaging is intended to embrace an arrangement wherein the stator is coated or a cement is utilized between the sleeve and the stator to hold the stator in place.

Although the invention has been described as embodied in a hysteresis synchronous motor, it will be appreciated that various aspects of the invention are equally applicable to other types of rotary electrical devices. It will further be understood that various modifications may be made in the hysteresis synchronous motor embodiment of the invention which fall within the scope of the invention as set forth in the appended claims.

I claim:

1. A hysteresis synchronous motor comprising:
   a stator core comprising a plurality of radially extending, angularly spaced teeth having slots therebetween opening into a rotor tunnel of said stator core through an interrupted subStantially cylindrical surface formed by said teeth;
   a stator winding wound in said slots of said stator core for developing a rotating field upon excitation of said stator winding;
   a rotor comprising a magnetic material having a high hysteretic constant, said rotor extending through said rotor tunnel of said stator core spaced from said substantially cylindrical surface;
   a pair of bearing means for rotatably supporting said rotor at opposite sides of said stator; and
   sleeve means including a pair of sleeve members comprising a magnetic material, each of said members including a first section of lesser thickness having substantially uniform inside and outside diameters and a second section of greater thickness having a maximum outside diameter greater than the outside diameter of said first section, said first section of said members extending into said rotor tunnel from opposite sides of said stator so as to form a relatively thin sleeve portion extending substantially through said tunnel for supporting said stator and closing said stator slots thereby reducing parasitic hysteresis losses, said second section of said members extending away from opposite sides of said stator so as to provide a relatively thick sleeve portion for supporting said bearing means.

2. The hysteresis synchronous motor of claim 1 comprising a retaining ring for holding one of said pair of bearing means axially in place with said sleeve means, one of said sleeve members including an annular groove in said second section of increased thickness for receiving said retaining ring.

3. The hysteresis synchronous motor of claim 2 further comprising another retaining ring for holding the other of said bearing means axially in place within said sleeve means, the other of said sleeve members including an annular groove in said second section of increased thickness for receiving said other retaining ring.

4. The hysteresis synchronous motor of claim 2 wherein said second section extends radially outwardly in the vicinity of said groove so as to permit a minimum inside diameter for said sleeve means at said retaining ring substantially equal to said uniform inside diameter of said first section.

5. A self-supporting electro-magnetic device comprising:
   a stator core having a central rotor tunnel;
   a stator winding wound on said core for developing a stator field upon excitation of said stator winding;
   a rotor extending through said tunnel of said stator core;
   a pair of bearing means for rotatably supporting said rotor on opposite sides of said stator; and
   sleeve means including a pair of sleeve members, each of said members including a first section of lesser thickness having substantially uniform inside and outside diameters and a second section of greater thickness having a maximum outside diameter greater than the outside diameter of said first section, said first section of said members extending into said rotor tunnel from opposite sides of said stator so as to form a thin stator-supporting sleeve portion extending substantially through said tunnel, said second sections of said members extending away from said rotor tunnel on opposite sides of said stator so as to provide support for said bearing means.

6. The self-supporting electro-magnetic device of claim 5 comprising a retaining ring for holding one of said pair of bearing means axially in place with said sleeve means, one of said sleeve members including an annular groove in said second section of increased thickness for receiving said retaining ring.

7. The self-supporting electro-magnetic device of claim 6 further comprising another retaining ring for holding the other of said bearing means axially in place within said sleeve means, the other of said sleeve members including an annular groove in said second section of increased thickness for receiving said other retaining ring.

8. The self-supporting electro-magnetic device of claim 6 wherein said second section extends radially outwardly in the vicinity of said groove so as to permit a minimum inside diameter for said sleeve means at said retaining ring substantially equal to said uniform inside diameter of said first section.

* * * * *